United States Patent [19]

Bied-Charreton et al.

[11] 4,001,563
[45] Jan. 4, 1977

[54] COMMUNICATION SYSTEM FOR DISSEMINATING CODED DIGITAL DATA IN ANALOGUE FORM UTILIZING AN ORTHOGONAL TRANSFORMATION

[75] Inventors: Phillippe Bied-Charreton; Francois le Carvennec; Erich Spitz, all of Paris, France

[73] Assignee: Thomson-CSF, Paris, France

[22] Filed: Sept. 17, 1975

[21] Appl. No.: 614,159

Related U.S. Application Data

[63] Continuation-in-part of Ser. No. 524,270, Nov. 15, 1974.

[30] Foreign Application Priority Data

Sept. 17, 1974 France .................. 74.31424

[52] U.S. Cl. .................. 235/152; 179/15 BC; 235/150.5; 325/42; 340/347 DA; 360/40
[51] Int. Cl.² .................. G06F 7/38; G11B 5/09
[58] Field of Search .................. 235/152, 156, 197; 360/40; 340/347 DD, 347 DA, 347 AD, 146.1 AL, 146.1 F; 179/15 BC; 325/42, 65

[56] References Cited

UNITED STATES PATENTS

| | | | |
|---|---|---|---|
| 3,337,858 | 8/1967 | Gillis et al. | 360/40 |
| 3,398,239 | 8/1968 | Rabow | 178/66 |
| 3,701,134 | 10/1972 | Gillard | 360/40 |
| 3,792,355 | 2/1974 | Miyata et al. | 179/15 BC X |

*Primary Examiner*—Joseph F. Ruggiero
*Attorney, Agent, or Firm*—Cushman, Darby & Cushman

[57] ABSTRACT

The present invention relates to the dissemination of binary digital data by analogue transmission or storage. The object of the invention is a communication system in which, prior to dissemination, the binary data are grouped into blocks forming vectors with N components, which are transformed into orthogonal vectors with N analogue components; after dissemination, the vectors experience a reverse transformation which makes it possible to reconstitute the binary digital data.

10 Claims, 15 Drawing Figures

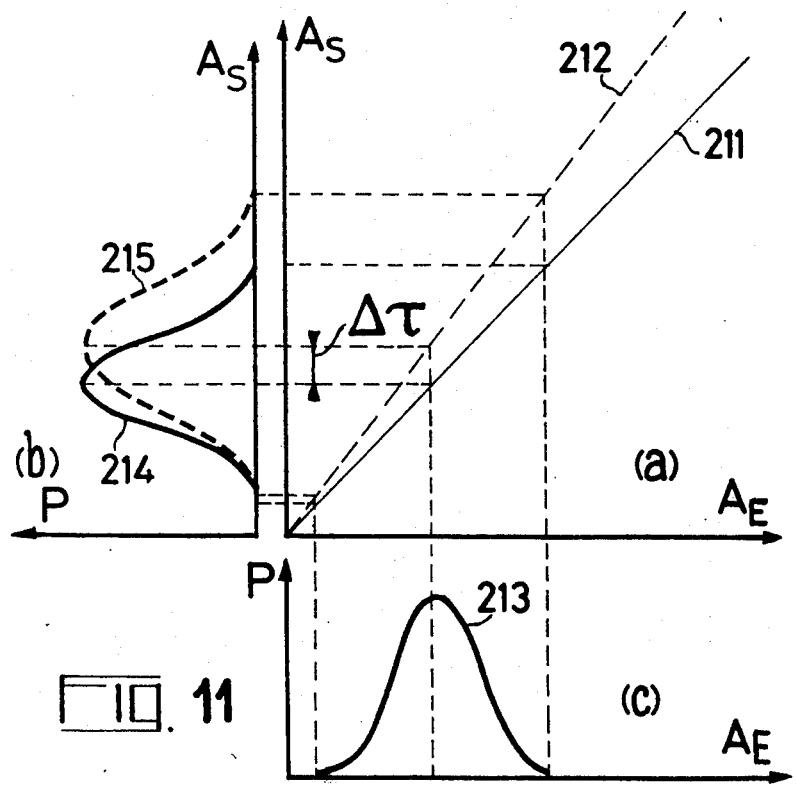
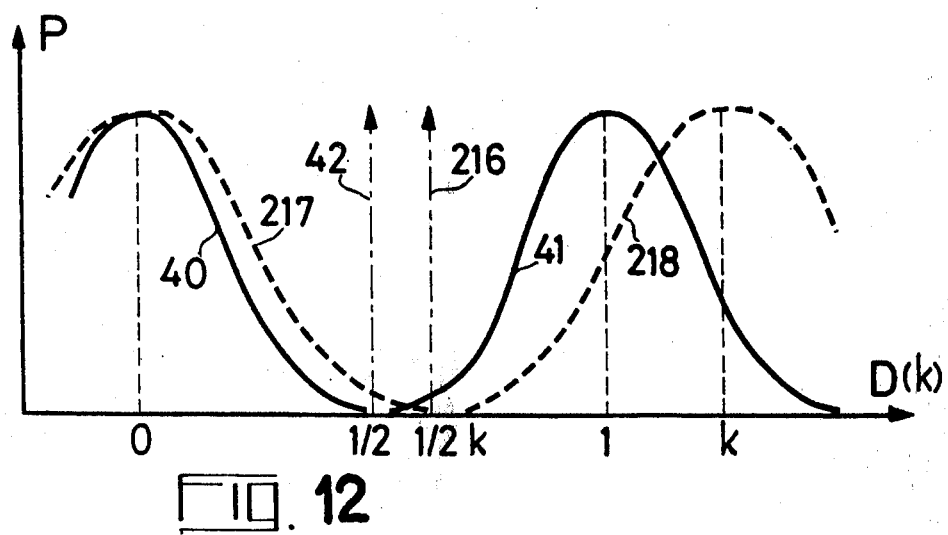

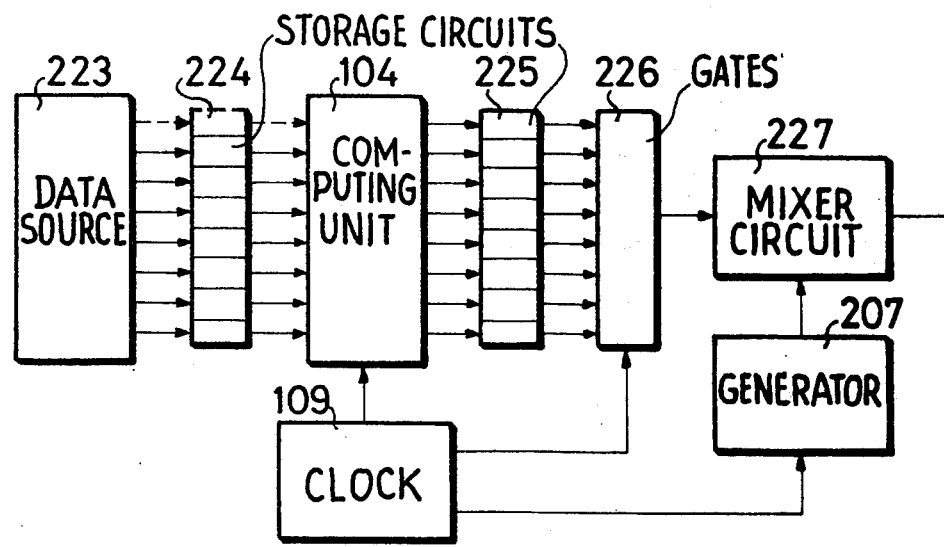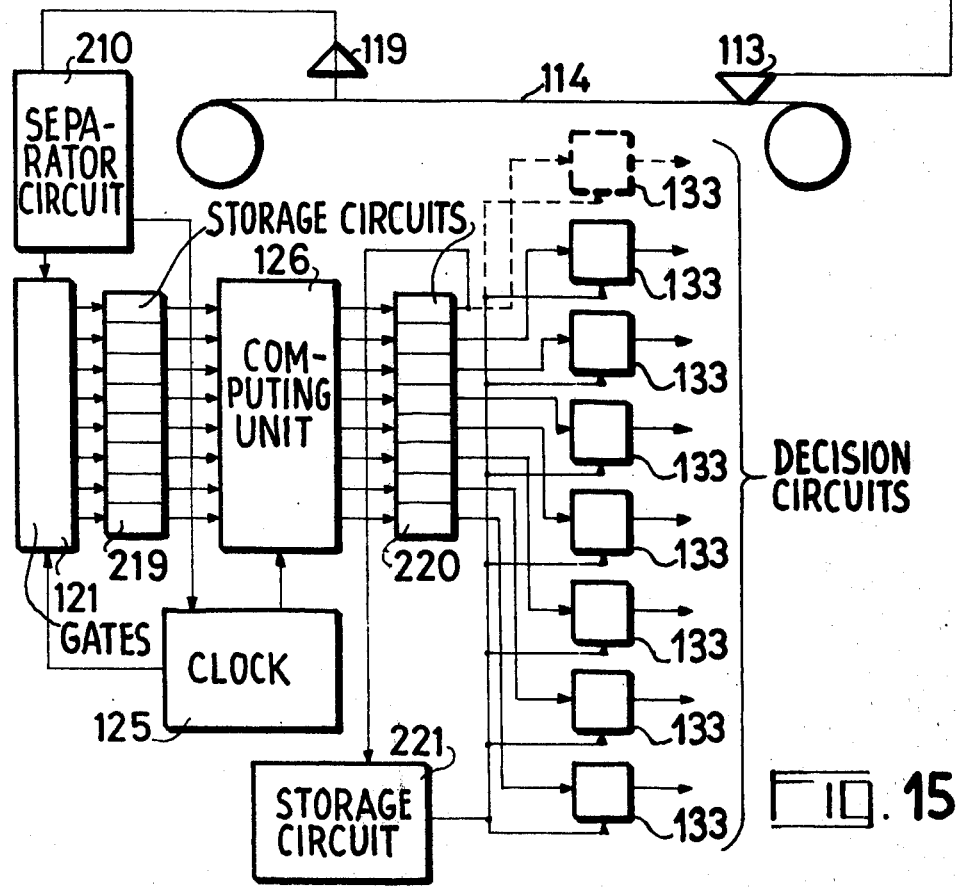
FIG. 15

COMMUNICATION SYSTEM FOR DISSEMINATING CODED DIGITAL DATA IN ANALOGUE FORM UTILIZING AN ORTHOGONAL TRANSFORMATION

This application is a continuation-in-part of application Ser. No. 524,270, filed Nov. 15, 1974.

The present invention relates to communication systems designed to disseminate information across a channel, said information occurring in the form of a succession of binary digital data, referred to as bits.

The dissemination of information can be effected by means of channels such as a transmission line or a physical vehicle constituted for example by a magnetic carrier capable of storing the data for dissemination, in an appropriate form. Whether it be the communication methods of transmission or the methods of storage which are involved, binary digital data are extremely vulnerable to certain kinds of disturbances which are capable of reversing the value of the bits. Such disturbances are generally of short duration and can be brought about in particular by short discontinuities known as drop outs which occur during read-out of a magnetic data carrier.

Quite apart from the problem of such disturbances, the dissemination of binary digital data likewise poses the problem of the transmission or storage density which it is possible to achieve for a given error rate.

If we compare the characteristics of magnetic data storage systems, then it will be seen that the storage density attained using analogue data, reaches a much higher figure than that attained with the direct storage of data bits. It will be observed, furthermore, that magnetic recording systems and magnetic data carriers are particularly expensive to manufacture if it is necessary to record and read-out binary signals with a low error rate. By contrast, the kinds of equipment used for the magnetic recording of analogue signals, such as magnetoscopes and tape-recorders, permit much wider tolerances to be used so that the costs of manufacture and operation are more economical. Similar observations can be made about the long-range transmission of binary or analogue data.

In order to improve digital data dissemination systems, and other things being equal, the invention proposes that the transmission and/or storage of such digital data should be carried out in an analogue form. To this end, the invention proposes that digital data should be sub-divided into blocks of N0 and 1 bits in order to form vectors having N binary components; these vectors are then subjected to an orthogonal transformation which produces in their place vectors having N analogue components which are disseminated in their stead; after dissemination, the analogue component vectors are in turn subjected to a reverse transformation operation, reconstituting the original vectors. The binary components of these reconstituted vectors can exhibit modifications which are much less marked than those which they would have exhibited in the absence of said transformation operations.

In accordance with the present invention, there is provided a communication system for the dissemination of digital data constituted by a succession of 0 and 1 bits coming from a data source, said communication system comprising: grouping means fed from said data source for grouping said bits in the form of vectors of N binary components, orthogonal transformation means receiving the vectors having said binary components and converting them into orthogonal vectors each having N analogue components, analogue means arranged for disseminating said orthogonal vectors, reverse transformation means receiving the disseminated orthogonal vectors, available at the output of said analogue means, and means for reconstituting said succession of bits from the reconstructed vectors of N binary components furnished by said reverse transformation means.

Fluctuations in sensitivity can occur during the dissemination of the analogue components, and this introduces another kind of noise against which precautions may have to be taken if the error rate is to be kept to an extremely low level. The adaptation of the data dissemination system to operation in the presence of sensitivity fluctuations, therefore constitutes one of the objects of the present application.

Another object is concerned with the synchronising of the blocks of components, which involves the combining means and the restructuring means. In other words, the orthogonal transformations of direct and reverse kind, must be applied to fully identified components and this requires the additional dissemination of a data block synchronising signal. This supplementary dissemination operation could be done with separate means, for example, two side-by-side storage tracks or two separate transmission channels. But dissemination of the analogue data and of the sync. signal required to identify them in each of the blocks could be jointly effected.

For a better understanding of the present invention, and to show how the same may be carried into effect, reference will be made to the following description and the attached figures among which:

FIGS. 11 and 12 are explanatory diagrams relating to the effects of sensitivity fluctuations occurring during data dissemination;

FIG. 15 schematically illustrates a data dissemination system adapted to a data source furnishing successive words of $p$ bits each.

In the following, the description has been confined to the method of data dissemination which consists in storing the data on a magnetic substrate, although the method could equally well involve dissemination using some other kind of data carrier without in any way excluding the possibility of line transmission which requires no storage at all.

Figure 1:
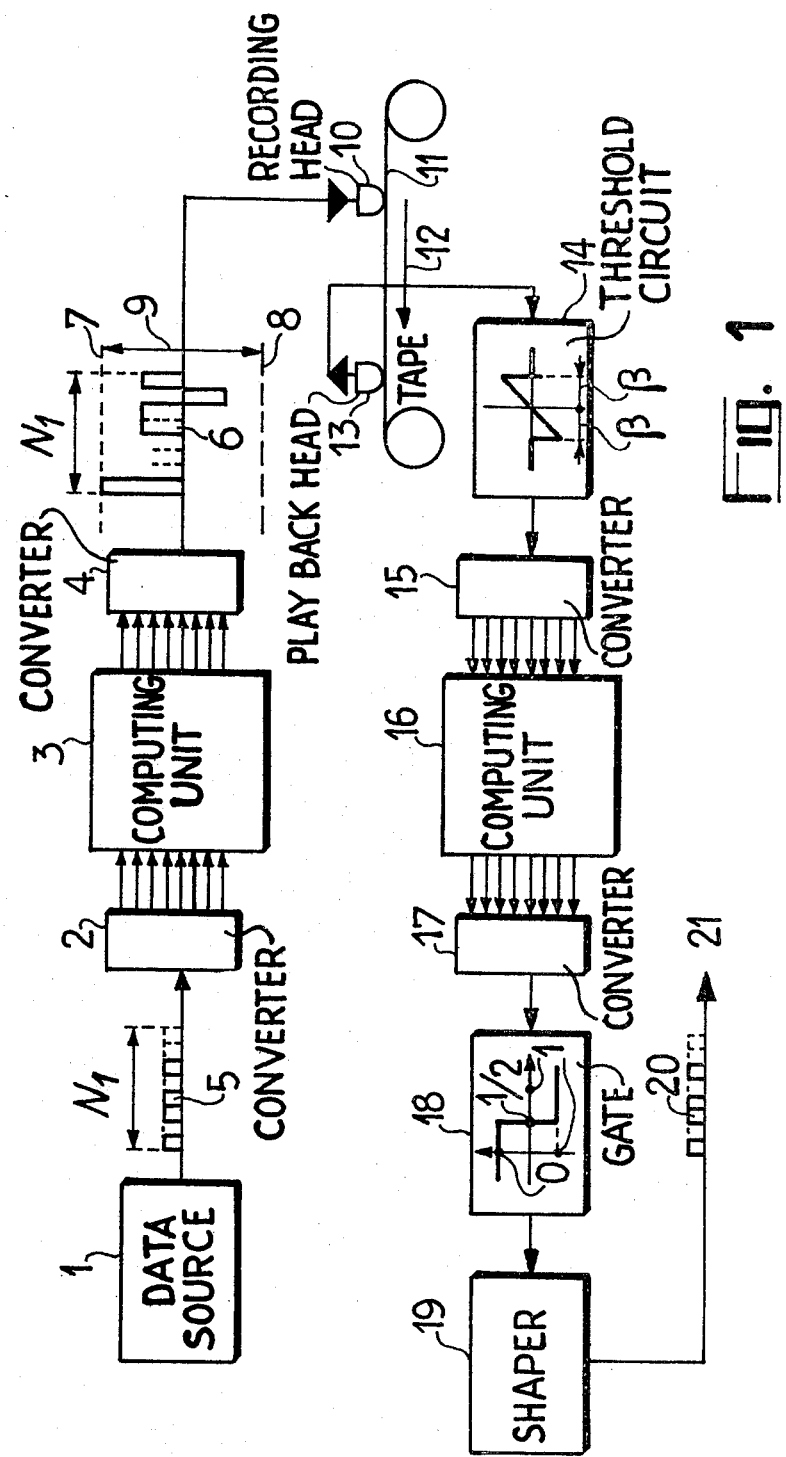
FIG. 1 is a block diagram of a binary digital data communication system utilizing analogue magnetic recording of said data.

In FIG. 1, there can be seen a data source 1 which can uninterruptedly supply 0 and 1 bits, and a magnetic recording device comprising, as those skilled in the art will understand:

a recording head 10, a read-out head 13, a magnetic tape 11 and means for causing said tape 11 to transfer in front of said heads 10 and 13 in the direction indicated by the arrow 12. It is well known to effect direct recording of binary data coming from the source 1, by connecting the latter to the recording head 10. The reconstitution of the data is then achieved directly at the output of the read-out head 13. This kind of direct recording must be performed with a low error rate and this requires that each bit be assigned a storage area of the order of $10^3$ microns squared. Moreover, in order to achieve satisfactory performance levels, it is necessary to utilise magnetic data carriers in respect of which the defect probability is less than $10^{-5}$ or $10^{-6}$.

In view of the fact that the bits are recorded one by one, only a short disturbance is necessary to cause bit reversal. Under these circumstances, noise protection is difficult to ensure. Those skilled in the art will be aware that disturbances of this kind occur locally along a data carrier in the form of discontinuities (drop-outs) or saturation states which can reverse the value of a "one" or a "zero".

Parallel with the direct magnetic recording of the bits, there is a section for the magnetic recording of analogue signals, which comprises apparatus in respect of which a much higher error rate is accepted and where an area of the order of 30 microns squared is accepted for each useful information element. This case arises in particular where magnetic recording of video frequency signals utilised for the transmission of television pictures, is involved.

In another context, the invention consists in utilising a communication apparatus designed to disseminate analogue data, for the purpose of recording or transmitting binary digital data with a considerably reduced error rate. This result is achieved by an appropriate transformation of the binary data, carried out prior to and during the phase of dissemination proper.

Referring again to the diagram in FIG. 1, between the data source 1 and the recording head 10 there has been arranged an assembly of means which make it possible to transform a block 5 of $N_1$ 0 and 1 bits into a block 6 of $N_1$ analogue components whose extreme values are located within an amplitude range 9 defined by the limits 7 and 8.

The system used to process the binary digital data comprises means 2 for the series-parallel grouping of said data, which are successively supplied with the $N_1$ bits 0 and 1 from the unit 5 and transform them into a vector with $N_1$ simultaneous components respectively having the values of said bits. The grouping means 2 are followed by a transforming unit with $N_1$ inputs and $N_1$ outputs, which converts the vector with $N_1$ binary components, into a vector with $N_1$ analogue components. The transformed vector is transmitted to a parallel-series converter 4 which restores the order of succession of the analogue components, this being necessary for the purpose of their recording on the carrier 11 by means of a single recording head. This converter is unnecessary if the $N_1$ analogue components are recorded simultaneously by means of $N_1$ recording heads 10.

Because of the processing which they experience prior to recording, the binary data are no longer available directly at the output of the read-out head 13. Therefore, in order to read them out, a reverse transformation system must be provided.

This system essentially comprises a series-parallel converter 15 supplied with the analogue signals furnished by the read-out head 13 and in its turn supplying analogue component vectors similar to those furnished by the computing unit 3; the read-out system furthermore comprises a reverse computing unit 16 which reconstitutes a binary component vector having the composition of the block 5. The system additionally comprises a threshold transmission circuit 14, a logic level discriminator 18 and a reshaping circuit 19. Moreover, a parallel-series converter 17 re-establishes the normal sequence of the bits so that at the output 21 a block or vector 20 of data identical to the block 5, appears.

In a general way, the operation of the system shown in FIG. 1 is as follows:

At the time of recording or in other words write-in, the data are grouped in vectors of $N = 2^p$ bits, where $p$ is a positive whole number. Each blocks of bits is equal to a vector $[D_o]$ with N binary components. The vector $[D_o]$ is transformed by computation to a vector $[A_o]$ which is recorded on the magnetic carrier. This transformation can be written in accordance with the rules of matrix algebra, as:

$$[A_o] = [M] [D_o]$$

where $[M]$ is the transformation matrix.

After read-out of the recording, and reverse transformation, a vector with analogue components $[A]$ and a vector with binary components $[D]$ are associated by the relationship:

$$[D] = [M]^{-1} [A]$$

The error between the read-out vector $[A]$ and the recorded vector $[A_o]$ depends upon the noise which is introduced and which can be represented by the vector $[B]$, thus, we have:

$$[A] = [A_o] = [B]$$

and, applying the preceding relationships, we obtain:

$$[D] = [M]^{-1} [A_o] + [B]$$

$$[\Delta] = [D] = [D_o] = [M]^{-1} [B]$$

$[\Delta]$ is the disturbance factor which translates the error between the input vector $[D_o]$ and the output rector $[D]$ of the system.

Serious defects in the magnetic recording are point type defects, such that the noise vector $[B]$ has only a few non-zero components. The optimum transformation defined by the matrix $[M]$ is that which distributes the non-zero components of the noise $[B]$ in the expression for $[\Delta]$. The orthogonal transformations represented by matrices without zero coefficient, satisfy this condition. To achieve a uniform distribution of the non-zero noise components, a further condition is that the elements of the coding matrix $[M]$ should have the same modulus.

Using these two criteria, it will be seen that of the relevant transformations, the Fourier transform and the Walsh-Hamadard transform are appropriate ones. From the practical point of view, the Walsh-Hadamard transform offers the advantage of simply requiring the calculation of the sums and differences of relative numbers. By contrast, the Fourier transform requires more elaborate calculations since it involves sums and products of complex numbers.

In the ensuing description, it is the orthogonal Walsh-Hadamard transform which has been described by way of non-limitative example. Following this hypothesis, the incidence of a point defect which can be ascribed to the magnetic carrier 11, in the disturbance factor $[\Delta]$ can be calculated by taking the components of the vector $[B]$ as follows:

$$[B] = \beta_i (0, 0, 0, \ldots 0, 1, 0 \ldots, 0, 0)$$

where $\beta_i$ is the value of the component of index $i$ disturbed by the point defect. Thus, we obtain:

$$[\Delta] = [H][B]$$

where $[H]$ is the Hadamard matrix.

By way of a concrete example if $[B]$ is a four-component vector, then we have:

$$[\Delta] = \beta_i \frac{1}{\sqrt{N}} \begin{vmatrix} 1 & 1 & 1 & 1 \\ 1 & -1 & 1 & -1 \\ 1 & 1 & -1 & -1 \\ 1 & -1 & -1 & 1 \end{vmatrix} \begin{vmatrix} 0 \\ 0 \\ 1 \\ 0 \end{vmatrix} = \beta_i \frac{1}{\sqrt{N}} \begin{vmatrix} 1 \\ 1 \\ -1 \\ -1 \end{vmatrix}$$

where $N = 4$.

We can conclude from this that the defect localised in the third component has the effect of producing, the sign excepted, a uniform distribution in the components of $[\Delta]$; the result is a disturbance amplitude $\sqrt{N}$ times smaller than the amplitude of the defect. Assuming that blocks of 256 bits are being used, the incidence of a defect will be reduced to a sixteenth of its value in each of the binary components of the reconstituted vector.

It is worthwhile understanding how a binary vector constituted for example by a block of eight bits, such as the block 5 in FIG. 1, is transformed. This block can be written $[D_o] = (1, 0, 1, 1, 0, 1, 0, 0)$. The orthogonal vector produced by the block 3 can be written:

$$[A_o] = [H_8][D_o] = \frac{1}{\sqrt{8}} (4, 0, 0, 0, 2, 2, -2, 2)$$

The probability distribution of the amplitudes of the components of the vector $[A_o]$ obeys the following rules:

a. to within the factor $$\frac{1}{\sqrt{N}}$$

the first component $A(o)$ has a mean value which is given by the mean number of 1 bits in the block of N bits; thus, we obtain:

$$\overline{A(o)} = \frac{\sqrt{N}}{2}$$

b. the mean value of the components $A(i)$ for $i \neq 0$ is zero.

Thus, $\overline{A(i)} = 0$ c. if it is desired to be able to store all the components of the vector $A_o$ within the same amplitude interval, then the component $A(o)$ must be subjected to an amplitude translation of $$\overline{\overline{A_o}} = \frac{\sqrt{N}}{2}.$$

All the components obey the same probability law and, knowing that the components of the vector $[D_o]$ are random variables having a root mean square deviation $\sigma D$ equal to ½, the root mean square deviation $\sigma A$ of the translated components of the vector $[A_o]$ is likewise equal to ½ since the transform is an orthogonal one.

d. the maximum amplitude of the components of the vector $[A_o]$ is $$\pm \sqrt{\frac{N}{2}}$$

after a translation of $A(o)$, one of these extreme values being reached when the block of N bits contains (N/2) 1 bits arranged in the order of a Walsh sequence.

Figure 2:
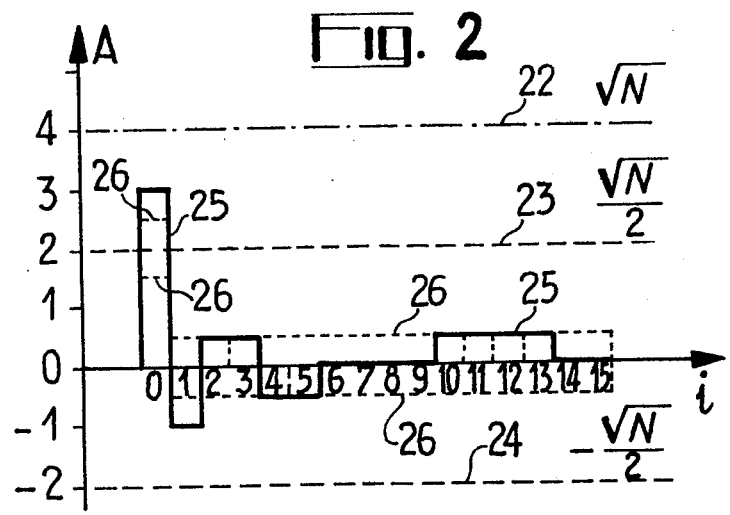
FIG. 2 illustrates a vector with 16 analogue components, obtained by an orthogonal Walsh-Hadamard transformation.

These various characteristics can be checked against FIG. 2 which illustrates a vector $[A_o]$ with 16 components represented by the rectangular envelope line 25. It will be seen that the first component $A(o)$ of order $i = 0$ is, prior to translation, situated beneath the line of level 22 which corresponds to the amplitude $A = \sqrt{N}$. After a translation of $A(o)$ all the components of the vector $[A_o]$ are regrouped between the lines of levels 23 and 24. The dashed lines 26 delimit a range corresponding to the standard deviation ½. This range is centred around the mean value $$\sqrt{\frac{N}{2}}$$

of $A(o)$ and the mean value zero of the $A(i)$ values of order $i \neq 0$.

From the preceding examples, it will be seen that the components of an orthogonal vector $[A_o]$ obtained by the Walsh-Hadamard transform of a binary vector having N components, are contained in an amplitude interval $\xi$ the boundaries 7 and 8 of which are respectively $$\sqrt{\frac{N}{2}} \quad \text{and} \quad -\sqrt{\frac{N}{2}}$$

if we are careful to translate $A(o)$ by the distance (N/2). This shows us that it is possible to store the components of $[A_o]$ by fully using the linear portion of the recording characteristics of a magnetic analogue data recorder. This being done, it is possible to detect and correct the errors corresponding to amplitude levels of very low probability.

Figure 3:
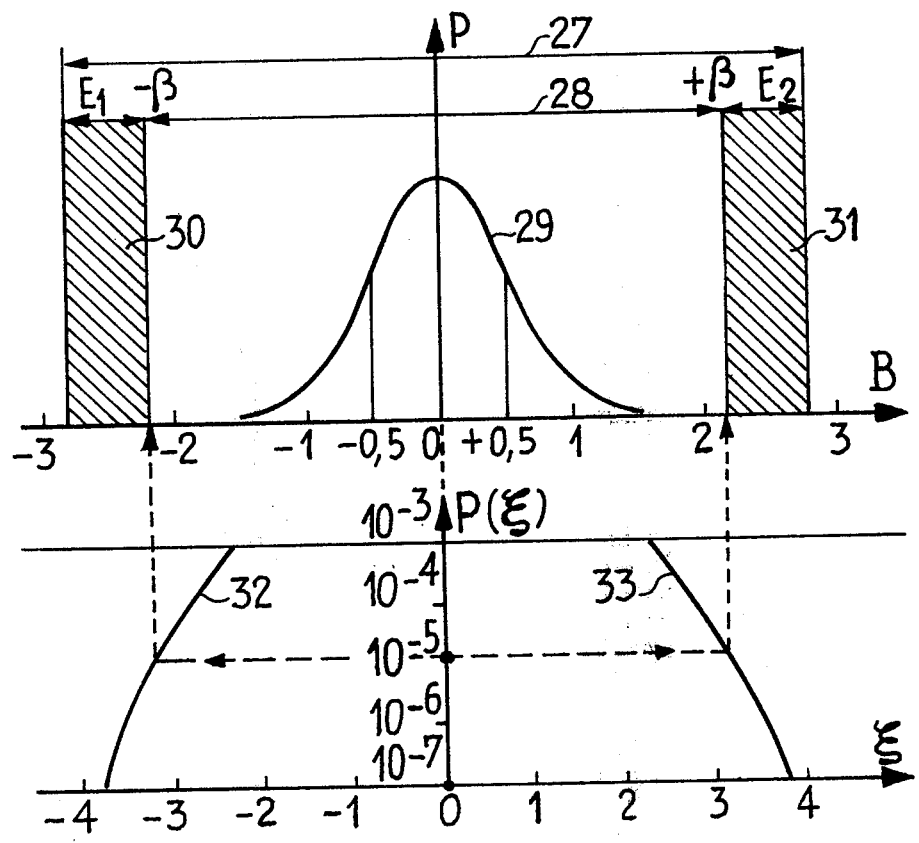
FIG. 3 is an explanatory diagram.

From what has been said thus far, it will be evident that the probability distribution of the amplitudes of the components of the orthogonal vector resulting from the Walsh-Hadamard transform, can be represented by the peaked graph 29 of FIG. 3. The distribution illustrates is the Gaussian distribution since it results in higher probabilities than those which are obtain in accordance with a less strict probability law.

FIG. 3 has been constructed for a vector $[A_o]$ with 32 analogue components, having an amplitude B with which there corresponds the reduced deviation $\xi = \sqrt{2}$ B. These two quantities are plotted on the abscissae on separate scales. On the ordinates, there have been plotted on the one hand the probability P relating to the abscissae values B, and on the other hand the probability $P(\xi)$ relating to the abscissae values $\xi$. This probability is the probability with which the amplitude of a component of the vector $[A_o]$, after a transposition of $A(o)$, will exceed the value B or $\xi$. The graph sections 32 and 33 represent the bottom parts of the peaked graph 29, and have been plotted using a logarithmic scale on the ordinates, corresponding to very low probabilities. The amplitude interval 27 contains all the amplitudes which can be acquired by the components of the vector $[A_o]$. The amplitude interval 28 having as its boundaries the thresholds $+\beta$ and $-\beta$ encloses the most probable values of the amplitudes of the components of the vector $[A_o]$. The two cross-hatched bands 30 and 31 of respective widths $E_1$ and $E_2$, correspond to component amplitudes in respect of which the probability of the threshold $\beta$ being exceeded is certainly less than $P(\xi) = 10^{-5}$. Also, from a consideration of FIG. 3, it will be observed that the most probable amplitude of a component of the transformed vector $[A_o]$, is equal to zero and that the probability tends towards zero at the boundaries of the interval 27.

FIG. 3 can be used as a basis by which to evaluate the performance level which can be expected of the communication system in accordance with the invention. In the course of operation, there are various factors which may be at work to falsify the reconstitution of the blocks of bits. Amongst these factors we have to consider point magnetisation defects due, for example, to dust, which give rise to zero or saturated read-out signals such as the "drop-out" phenomena encountered in video-recording. It is possible to detect these defects because there correspond to them values of the components of the transformed vector $[A_o]$, which have a very low probability. If we fix an interval between the boundaries $+\beta$ and $-\beta$ outside which these point defects are assumed to be localised, the probability $P(\beta)$ of encountering a component of the vector $A_o$ outside this interval, has a top limit of $P(\beta) = \text{erfc}(\beta)$ where erfc is the complementary error function.

As soon as the threshold $\pm \beta$ has been exceeded by a read-out amplitude, this can be attributed to a point defect and to correct this disturbed amplitude, it may be decided to substitute for it the most probable value which is zero. This method of mean correction comes down to introducing into the read-out channel, a threshold transmission device of the kind marked 14 in FIG. 1. This device 14 transmits linearly any amplitudes which are less in absolute value than the threshold $\beta$, and substitutes for them the value zero beyond the threshold $\beta$.

If this kind of detection and correction of the point defects is adopted, the error introduced into the components of the reconstituted vector $[D]$, can be obtained by dividing the interval $\beta$ by the distribution factor $\sqrt{N}$. Thus, we obtain the condition which determines the width of the disturbance:

$$|[D] - [D_o]| = \frac{\beta}{\sqrt{N}}$$

To ensure that this kind of disturbance does not produce reversal of the value of the bits which it affects, it is necessary that the condition $$\frac{\beta}{\sqrt{N}} < \frac{1}{2}$$

should be satisfied.

Figure 5:
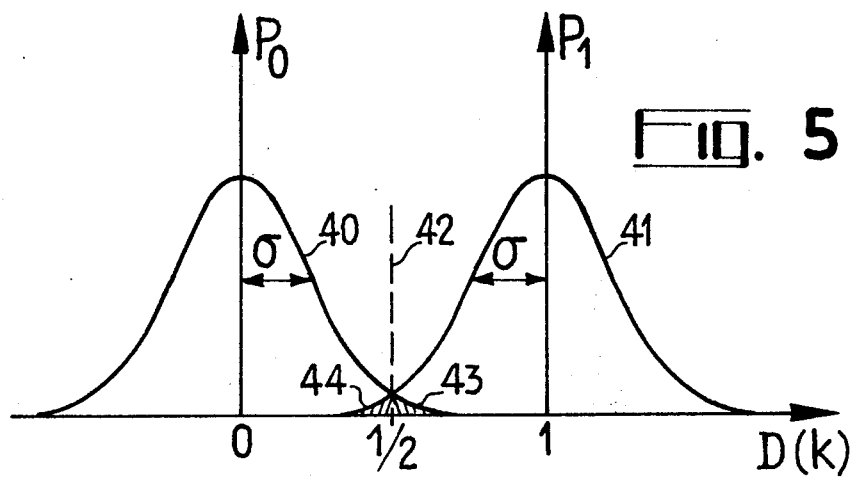
FIG. 5 is an explanatory diagram.

FIG. 5 in fact illustrates the principle of detection of 0 and 1 bits in the presence of noise. The amplitudes $D(k)$ of the components of order $k$ of the reconstituted binary vector, are plotted on the abscissae about the values 0 and 1. The probability distributions $P_o$ and $P_1$ of the 0 and 1 values are represented respectively by the two peaked graphs 40 and 41, which have the same standard deviation $\sigma$. The graphs 40 and 41 intersect at their bases at the abscissae value $\frac{1}{2}$ of the decision level. The cross-hatched zone 44 illustrates the probability of reversal of a 1 bit and cross-hatched zone 43 illustrates the probability of reversal of a 0 bit. In FIG. 1, the element which decides the probable value of the reconstituted bits is the transmission circuit 18 whose decision threshold is adjusted to $\frac{1}{2}$. A circuit for reshaping bits, 19, follows the decision element 18. The foregoing out of balance equation can be put in the form:

$$N > 4\beta^2$$

This condition links the threshold of detection of point defects, with the number of bits N in the blocks.

The point error rate $T_d$ for a block of N components is given by the relationship:

$$T_d = N \cdot P_d \cdot P(\beta)$$

where $P_d$ is the probability of a point defect in the read-out device used.

The foregoing analysis has assumed that the exceeding of the threshold is the sign which indicates the existence of a point defect. In fact, the threshold $\beta$ is exceeded on occasions which are due to real components, albeit of very low probability, of the vector $[A_o]$. These occasions constitute false alarms the ratio $T_f$ of which, for a block of N bits, is given by:

$$T_f = N \cdot P(\beta)$$

By comparing this false alarm ratio with that of the point defects, we see that:

$$T_d = P_d \times T_f$$

The results is that with a defect probability as high as $P_d = 10^{-2}$, the point error rate $T_d$ becomes negligible compared with the false alarm ratio. This means that in the system in accordance with the invention, it is possible to utilise magnetic carriers of very much inferior quality to those used for the direct recording of binary data, where $P_d$ must be less than $10^{-5}$.

Figure 4:
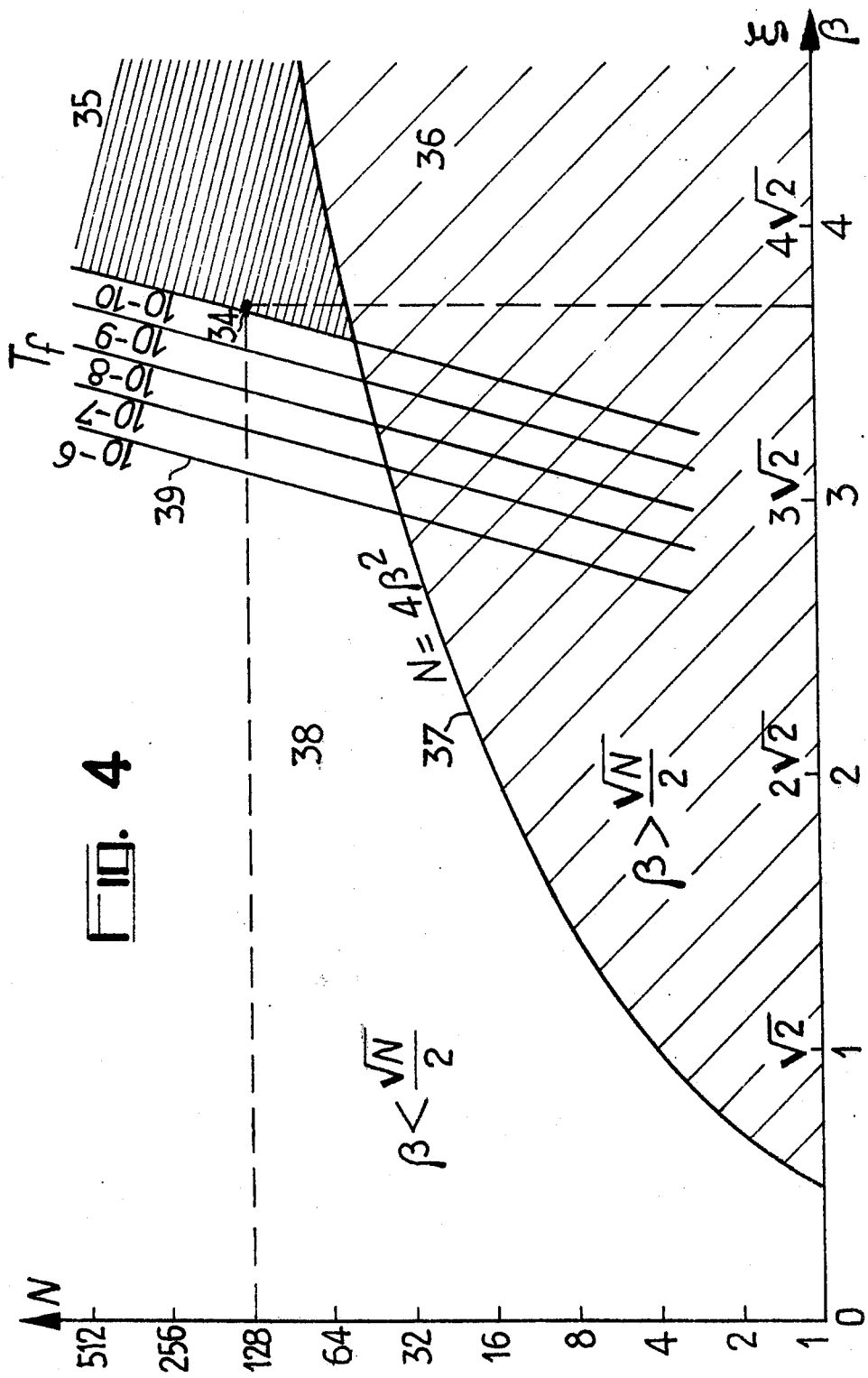
FIG. 4 is a nomograph illustrating a possible example of operation.

The nomograph of FIG. 4 makes it possible to chose a combination of values $(N, \beta)$ which takes account of the false alarm ratio $T_f$ not to be exceeded. On the ordinates, the number of bits in the blocks have been plotted and on the abscissae the detection threshold value $\beta$ with the corresponding reduced error. The graph 37 of the equation $N = 4 \beta^2$, defines a zone 38 where there is no reversal of 0 and 1 bits. The cross-hatched zone 36 must not contain a system operating point because bit reversal takes place there. On the nomograph a family of lines 39 has also been shows, the parameter for this family being the false alarm ratio $T_f$. The zone 35 located to the right hand side of the line 39 corresponding to the chosen value of $T_f$, and above the curve 37, is the useful zone within which the working point of the system in accordance with the invention should be chosen.

In the foregoing, it has been assumed that in order to correct an amplitude which exceeds the threshold $\beta$, the most probable value 0 should be substituted for it. It is also possible to chose a stricter criterion which consists in assuming that the error occurring before distribution, in the components of the vector [D] is equal to $2\beta$ instead of $\beta$.

In this case, the graph 37 would have to satisfy the equation $N = 16 \beta^2$. Hitherto, we have left aside any consideration of random noise in the analogue magnetic recording device. This noise breaks down into two components:

a. The quantising noise which is due to the limited precision of calculation of the orthogonal transform of the vectors;

b. The inherent magnetic recording noise which is evaluated by the ratio $\gamma$ of the effective signal energy to the noise energy.

The quantising noise can be rendered negligible vis-a-vis the noise inherent in the magnetic recording. If we call $\sigma_M$ the standard deviation of the noise, which experiences no change during the course of the reverse transformation, then of course the error ratio $T_a$, that is to say the probability of reversal of 0 and 1 bits, is given by the expression:

$$T_a = \tfrac{1}{2} \operatorname{erfc}\left(\frac{\sqrt{\gamma}}{2}\right)$$

Figure 6:
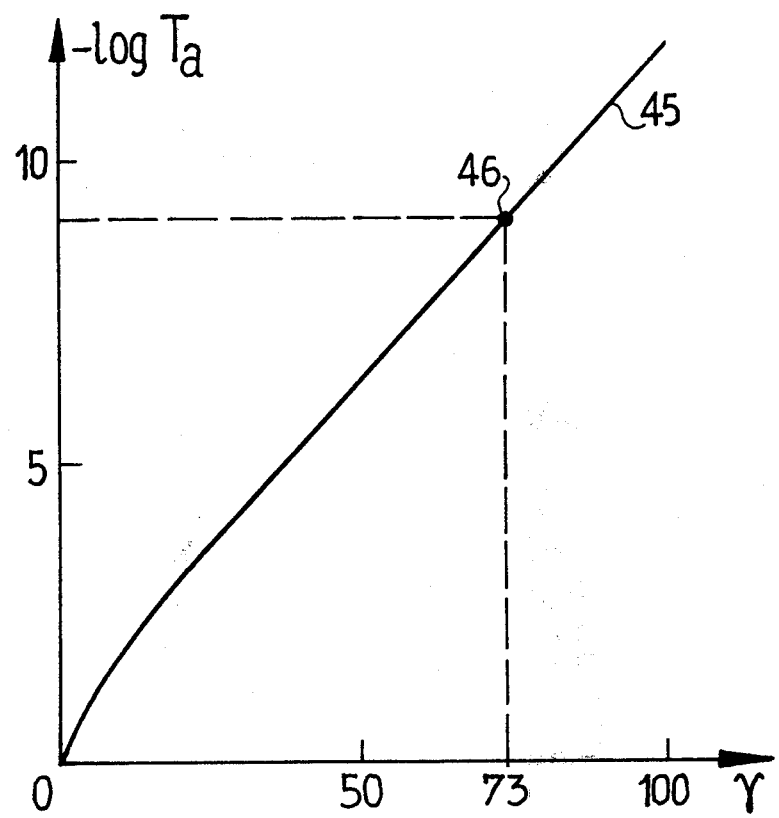
FIG. 6 is a nomograph indicating the relationship linking the error rate to the signal-to-noise ratio of the analogue magnetic recording.

This expression has been plotted in FIG. 6 in the form of a graph 45. On the abscissae there have been plotted the signal-to-noise rate $\gamma$ and on the ordinates the logarithm to the base 10 of the error rate $T_a$ due to the random noise. The point 46 indicates than an error rate $T_a$ of $10^{-9}$ requires a signal-to-noise ratio of better than 73. Such a low value on the part of the signal-to-noise ratio of readily achieved using analogue magnetic recorders of the magnetoscope type.

In a practical embodiment, the values of $T_d$, $T_f$, and $T_a$ will be chosen in order to satisfy the double out of balance equation:

$$T_d < T_f < T_a$$

The chief limitation of the system in accordance with the invention is due, therefore, solely to the limitation on the signal-to-noise ratio at the analogue magnetic recording level.

We have seen that the components of the vector $[A_o]$ are likewise affected by a noise component of mean value zero and standard deviation $\sigma_M$. Thus, all the components $A(i)$ located within an interval $dA = \sqrt{2}\,\sigma_M$ should be regarded as undiscernible. Accordingly, the full interval $\Delta A = 2\beta$ will then enable a number $n$ of discernible levels, equal to:

$$n = 2\beta \sqrt{\gamma}$$

to be defined; in other words $$\gamma = \frac{1}{2\sigma_M^2}$$

The storage of $n$ discernible levels in the magnetic carrier, will require an area equal to $\log_2 n$ times the area required for an information or data element. If, for example, blocks of 128 components and a signal-to-noise ratio of $\beta = 73$, with a threshold of $\beta = 3.7$, are adopted, then it will be seen that $n = 64$ discernible levels are required. Using a density of 30 square microns per stored point, each component will require a storage area of $6 \times 30 = 180$ square microns.

In conventional binary data magnetic storage systems, using the chosen error rate of $10^{-9}$, a storage area of the order of 1000 square microns per bit, is required. Thus, the communication system in accordance with the invention improves the storage density but to a lesser extent than that which is obtained when storing television signals where the permissible error rate is higher.

Figure 7:
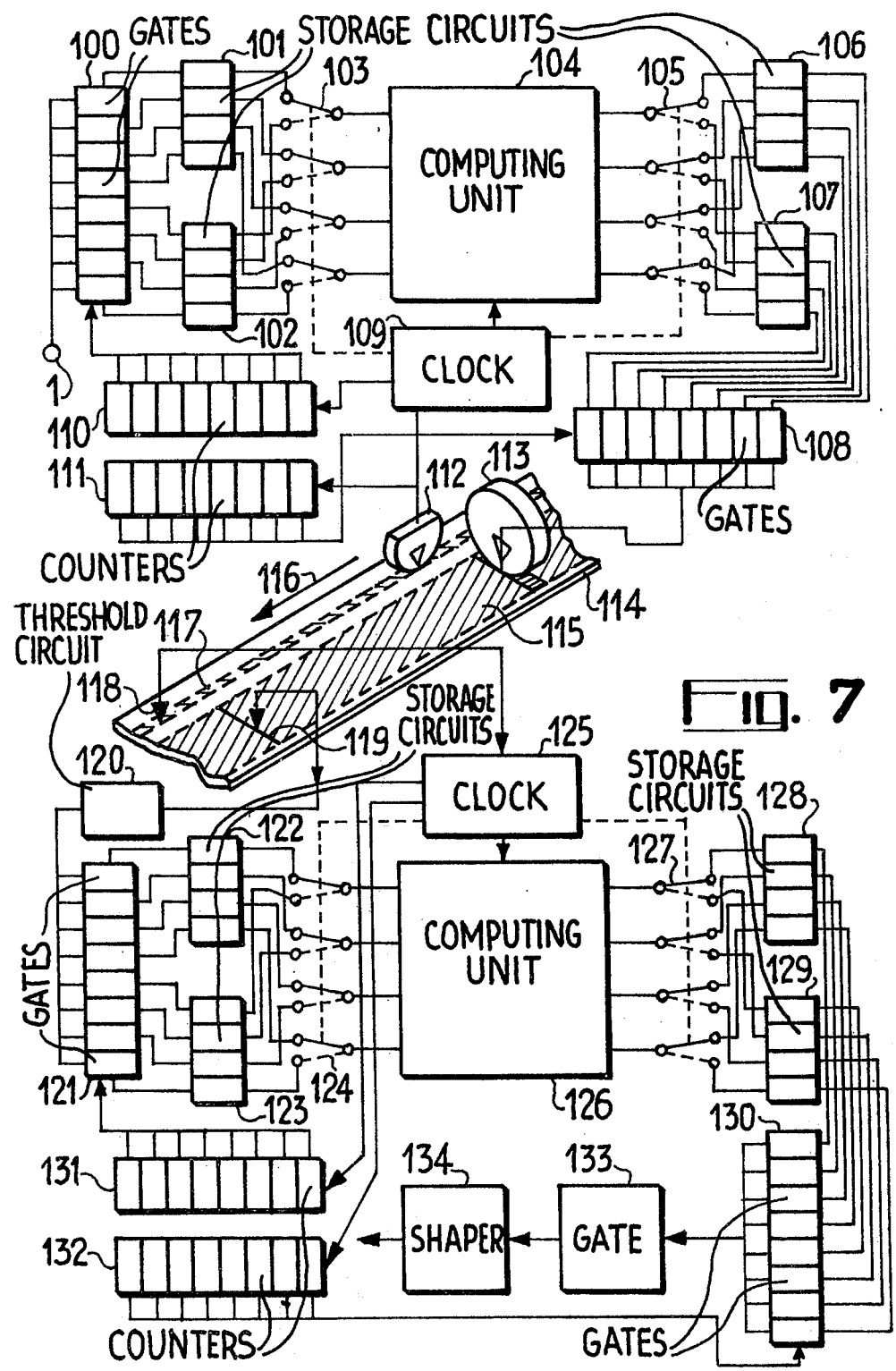
FIG. 7 illustrates a communication system for the dissemination of binary digital data, in accordance with the invention.

In FIG. 7, there can be seen a practical example of the system of disseminating binary data, in accordance with the invention. For the sake of clarity of the drawing, the number of components in each block has been limited to four although in reality this number is very much larger.

To the input 1 of the system there is connected the binary digital data source. An assembly 100 of analogue gates controlled by a first counter 110 routes the 0 and 1 bits corresponding to two consecutive blocks of four components, towards analogue storage circuits 101 and 102. At the outputs of the store unit 101, there are simultaneously available the four components of a vector $[D_o]$, and at the outputs of the store unit 102 there are simultaneously produced, during a later phase of operation, the four components of another vector $[D_o]$. A switching circuit 103 represented by a stack of reversing switches, makes it possible to apply the components of $[D_o]$ coming from the unit 101, to input terminals of a computer unit 104 which is capable of performing the orthogonal transform of the vector $[D_o]$ into the transformed vector $[A_o]$; the analogue components of the vector $[A_o]$ are transmitted by another switching circuit 105, represented by a stack of reversing switches, to a block of analogue stores 106. The computer unit 104 is alternately connected to the blocks or units, 101 and 106, during a first phase of operation and to their counterparts, 102 and 107, during the second phase of operation. The blocks of analogue stores 106 and 107 supply an assembly of logic gates 108 controlled by a second shift-register 111. A clock 109 controls the various operations and furnishes a reference signal to a recording head 112 recording a track 117 on the surface of a magnetic data carrier 114 displacing in the direction 116. Another recording head 113, which can perform a rotational motion in order to increase the speed of displacement of its reading gap relatively to the magnetic data carrier 114, is used to record the data. This main recording head 113 is supplied by the combined outputs of the assembly of analogue gates 108. The magnetic carrier 114 is thus magnetised along two tracks 115 and 117; the track 115 comprises a succession of recorded sections corresponding in each case to a block of binary digital data received at the input 1; the track 117 is the synchronising track which is used to precisely mark the data blocks stored in the track 115. Self evidently, the track 115 could be subdivided into N parallel tracks and the recording head 113 could itself also be divided into N elementary heads to which the simultaneous components of the transformed vector [$A_o$] could be applied.

The read-out of the data recorded on the magnetic carrier 114, is effected by means of two read-out heads 118 and 119 which respectively read the tracks 117 and 115. The read-out head produces a synchronising signal which is used to synchronise a clock 125. The read-out signal produced by the main read-out head 119, is fed through a threshold transmission circuit 120 similar to that 14 of FIG. 1; it is then applied to an assembly 121 of analogue gates controlled by a counter 131. The outputs of the analogue gates of the assembly 121 are connected to the inputs of two blocks of analogue stores 122 and 123. Switching means 124 make it possible to connect the outputs of one of the two store blocks 122, 123 to the inputs of a computer unit 126 which is capable of performing the reverse transform of the analogue component vectors [A] into binary component vectors [D]. Second switching means 127 make it possible to alternately transmit the signals produced by the outputs of the computer unit 126, to a first block of analogue stores 128 or to a second block of analogue stores 129. The outputs of the blocks 128 and 129 are connected to an assembly of analogue gates 130 controlled by a second counter 132. The binary components successively available at the grouped outputs of the analogue gates 130, are transmitted to a decision circuit 133 similar to that 18 shown in FIG. 1. The output of the decision circuit 133 supplies a circuit 134 which reshapes the 0 and 1 bits.

Figure 8:
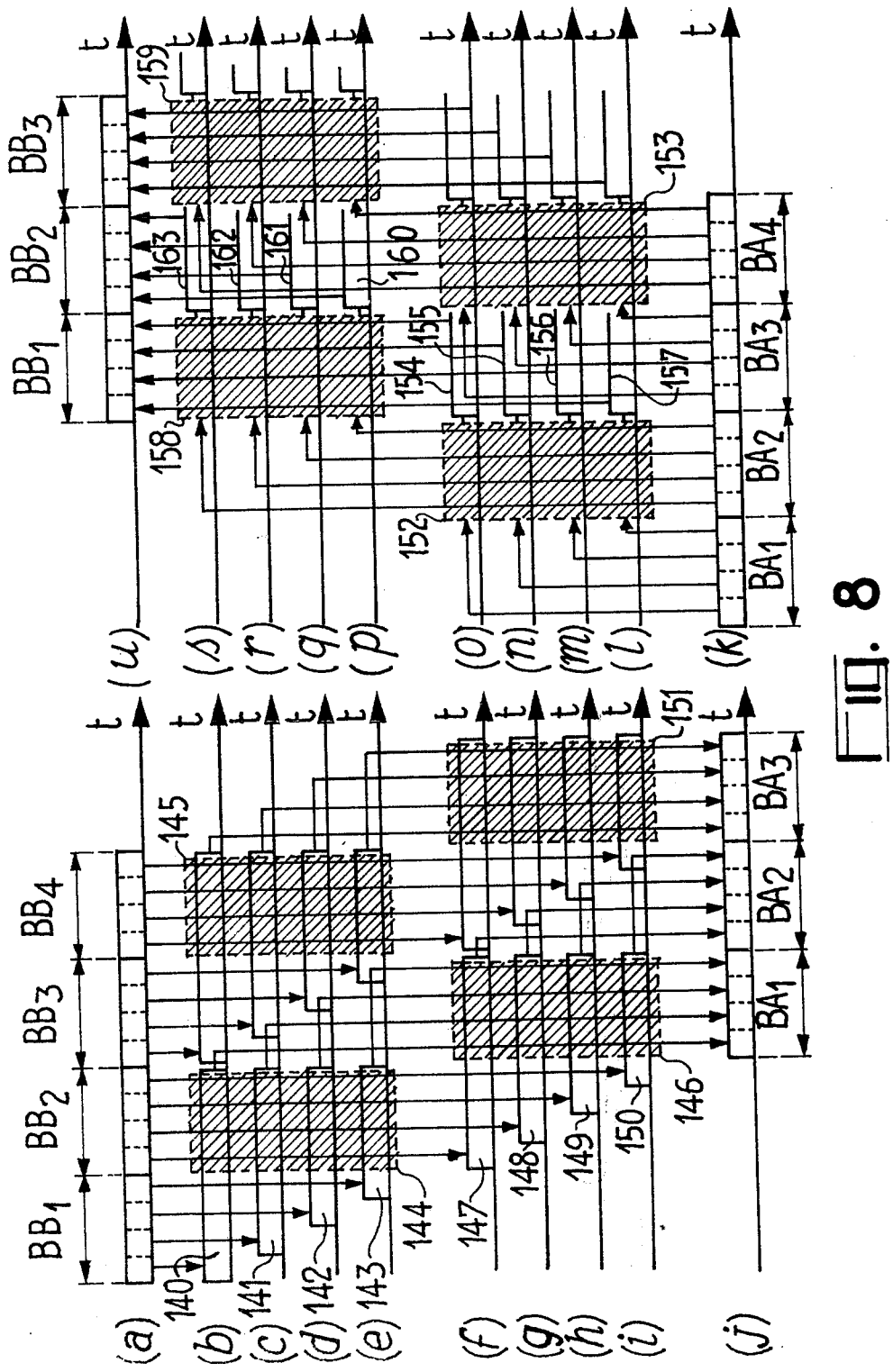
FIG. 8 illustrates the operation of the system shown in FIG. 7.

The process of operation of the system shown in FIG. 7, has been illustrated in FIG. 8.

At (a), there has been illustrated the sequence in time $t$ of four blocks or bits $BB_1$, $BB_2$, $BB_3$ and $BB_4$, each comprising four successive bits. These binary data are applied to the input 1 of the system shown in FIG. 7.

At (b), (c), (d) and (e), there have been illustrated the respective contents of the analogue stores of the block 101. The rectangular areas 140, 141, 142 and 143 respectively symbolise the retention in storage of the four components of the block $BB_1$; the arrows linking $BB_1$ with the said rectangular areas, indicate the transfer of the data of the block 101 as ordered by the top half of the assembly 100, by the register 110 and by the clock 109. At (f), (g), (h), and (i), there have been illustrated the respective contents of the analogue stores of block 102; input of data from the block $BB_2$ to the block 102 takes place as soon as the block $BB_1$ has been stored in the block 101. The rectangular areas 147, 148, 149, and 150 symbolise the retention of the data of block $BB_2$ and the arrows indicate the transfer of these data as ordered by the bottom half of the assembly 100, the register 110 and the clock 109.

As soon as the block of bits $BB_1$ has been stored in the block 101, the computer unit 104 is connected to this latter block and simultaneously receives the four components of the vector [$D_o$]. The computing operation involved by the orthogonal transform, are symbolised by a cross-hatched area 144, which starts as soon as the block $BB_1$ is in storage and terminates before the block $BB_2$ is stored in its turn. The computing area 144 covers the areas 140, 141, 142 and 143 and when it ends, the four analogue components of the vector [$A_o$], corresponding to the block $BB_1$, are obtained. In line (j) of FIG. 8, the analogue components which are recorded by the magnetic data carrier 114 in track 115, have been shown. These analogue components succeed one another in time $t$, and are grouped four by four in order to form the blocks $BA_1$, $BA_2$, $BA_3$ ... corresponding respectively to the input blocks $BB_1$, $BB_2$, $BB_3$ ... The broken arrows linking the areas 140, 141, 142 and 143, with the block $BA_1$ indicate the storage of the analogue components computed in the block 106 and their transfer to the recording head 113 via the right-hand halves of the analogue gates 108 which are controlled by the clock 109 through the register 111. The computing area 146 relates to the transformation of the binary data of block $BB_2$; it thus covers the areas 147, 148, 149 and 150 and develops in succession to the computing area 144 since it is the same computer unit 104 which is used. To this end, the computer unit 104 is switched alternately between the blocks 101 and 106 and their counterparts 102 and 107, by switching means 103 and 105 which operate synchronously. The computing areas 144 and 145 correspond to the transformation of odd order blocks $BB_1$ and $BB_3$, whilst those 146 and 151 correspond to the transformation of even order blocks $BB_2$ and $BB_4$.

The right-hand part of the operating diagram shown in FIG. 8, corresponds to the read-out of the data recorded on the magnetic data carrier. In line (k) the succession of blocks $BA_1$, $BA_2$, $BA_3$ and $BA_4$ of analogue data furnished by the read-out head 119 has been shown. At (o), (n), (m) and (l), the respective contents of the four analogue stores of (l), block 128 have been shown. At (s), (r), (q) and (p), the respective contents of the four analogue stores of the block 129 have been shown. The reverse transform of the block $BA_1$ takes place during the course of the computing area 152 after the analogue data have been stored in the manner indicated by the broken arrows linking the block $BA_1$ to the area 152. When computing has been carried out, four binary components are obtained the storage of which in the block 128, is symbolised by the rectangular areas 154, 155, 156 and 157.

These binary components are transferred from the block 128 to the output elements 133 and 134 through the agency of the analogue gates of the assembly 130 and under the control of the register 132. The reverse transformation of the block $BA_2$ takes place during the computing phase 158 and the resultant binary components are accumulated in the analogue store block 129. These binary data are then transferred by the analogue gates 130 to the output elements 133 and 134. These transfers have been shown in FIG. 8 by the upward arrows which terminate at the line (u) where the succession of blocks of bits $BB_1$, $BB_2$, $BB_3$ ... is reformed.

The computing areas 152 and 153 correspond to the reverse transform of the analogue blocks of odd order $BA_1$ and $BA_3$. The computing areas 158 and 159 correspond to the reverse transform of the analogue blocks of even order $BA_2$ and $BA_4$. The computer units 104 and 126 perform orthogonal transforms such as Fourier or Walsh-Hadamard transforms. In these cases, the direct transform is performed in the same fashion as the reverse transform and in FIG. 1 it will be seen that the majority of the elements used for recording can also be used without modification, for read-out.

The design of a computer unit which will perform the Fourier or Walsh-Hadamard transform of a vector having N analogue components, has been very adequately described in literature on the subject. Such a computer is described in the article entitled "A hybrid Walsh Hadamard transform computer." by J. W. CARL and R. V. SWARTWOOD, from IEEE Transactions on computers, Vol. C22, No. 7 July 1973, pages 669 to 672. It can be put into effect using a relatively small number of amplifiers, with the help of iterative techniques. If calculation is carried out in analogue fashion, then the components of the transformed vector are obtained directly at the output of the computer unit.

If calculation is effected by a digital computer programmed using the known algorithms of the aforementioned orthogonal transforms, then the components are produced in the form of trains of n bits. These trains of bits are then converted into analogue values by a digital-analogue converter following the computer unit 104. A similar arrangement is employed at read-out in order to make it possible for a programmed digital computer unit 126 to carry out processing and perform the reverse orthogonal transform.

The reference track 117 makes it possible to readily mark the different blocks of analogue components recorded on the magnetic data carrier. This track is not essential if the blocks are separated on the track 115. The scanning of the blocks by the read-out head 119 can then furnish the synchronising signal required by the clock 125.

Another possibility consists in using a synchronising signal disseminated with the analogue components for marking the commencement of each block. This solution needs means for elaborating a composite signal which comprises the analogue components of the blocks and pulses forming the synchronising signal.

Figure 9:
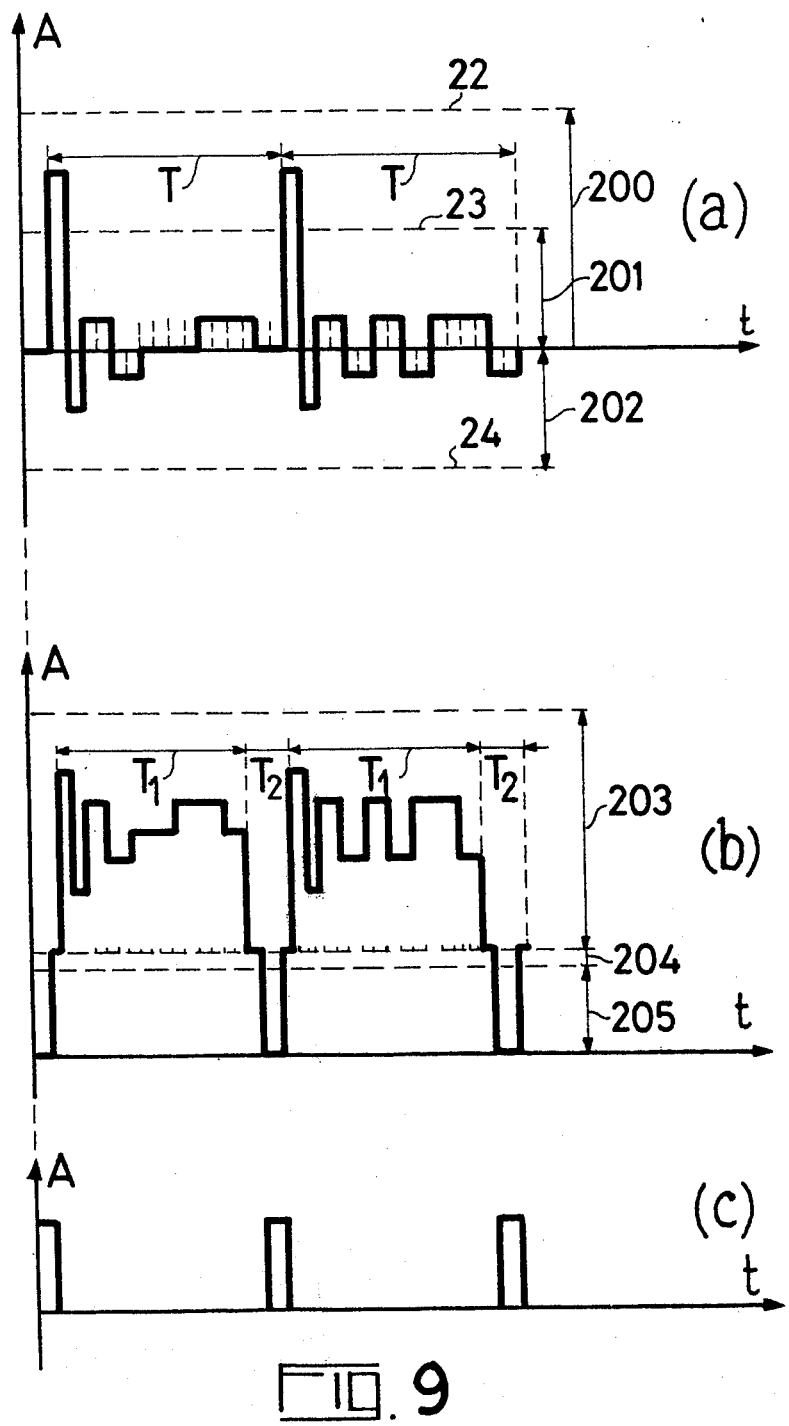
FIG. 9 is composed of explanatory diagrams.

In FIG. 9, at (a) there has been illustrated as a function of time $t$ the variation in the amplitude A of a voltage translating the content of two successive blocks of analogue components. The duration T assigned to the transmission of a block with $N = 16$ components, corresponds in FIG. 1(a) to the sum of 16 equal intervals which are marked 0, 1, 2, ... 14, 15 from left to right. Considering a WALSH-HADAMARD transformation and considering all the possible combinations of N bits 0 and 1, it can be shown that the analogue components A(0), A(1), A(2) ... A(N−2) and A(N−1) of a transformed block, have amplitudes which satisfy the following conditions:

The amplitude of the component A(o) of index zero, is contained within an amplitude range 200 delimited by the axis $t$ (amplitude zero) and the line at the level 22 (amplitude $\sqrt{N}$);

The amplitude of the other components A($i$), in which $i \neq 0$, are located within an amplitude range 201–202 the top limit of which is defined by the line at level 23

$$\left(\text{amplitude } \frac{\sqrt{N}}{2}\right)$$

and the bottom limit by the line at level 24

$$\left(\text{amplitude } -\frac{\sqrt{N}}{2}\right).$$

It is a simple matter to arrange all the analogue components in one and the same amplitude range having a total width of $\sqrt{N}$. It is possible, if required, to substract from A(o) the value $$\frac{\sqrt{N}}{2}$$

or, instead, to add it to the other components A($i$)$_i \neq 0$. By means of this translation, it is contrived that all the analogue components are located between the same amplitude limits. Moreover, it can be shown that they have the same mean square interval and a mean value of zero.

To identify the components in each block, a synchronising signal is required. This signal is shown at (c) in FIG. 9 and comprises a train of short pulses of recurrence frequency 1/T. The blocks of analogue components and the synchronising pulses could be jointly disseminate, in the form of a composite signal such as that shown at (b) in FIG. 9.

This composite signal comprises a first amplitude range 203 and a second amplitude range 205 adjacent to the first but not contiguous therewith. A dead range 204 is provided between the ranges 203 and 205 so that they are properly separated from each other. The range 203 is reserved for the dissemination of the analogue component blocks. These are disseminated at a higher rate since the duration $T_1$ has been reduced in relation to T in order to create a time interval $T_2$ of sufficient width to accommodate there one of the pulses of the block synchronising signal. The insertion of the synchronising pulses takes place in the amplitude range 205 in order to make it possible to effect ready separation between the two types of signals. In the case shown in FIG. 9(b), the range 205 is located below the range 203 but the reverse is equally possible. The time interval $T_2$ is longer than the duration of the synchronising pulse and the latter can advantageously be bracketed by equalising steps located in the range 204. The composite signal of FIG. 9(b) has a close similarity in form with the video frequency signals encountered in television work. To obtain this signal, it is necessary, after having translated the zero index analogue component by $\sqrt{N}$ 2 in relation to the others, to pick-off the components at the rate $$\frac{\sqrt{N}}{T_1}$$

and to superimpose the resultant signal on the synchronising pulses, adopting appropriate amplitude limits for the signals which are to be mixed.

Figure 10:
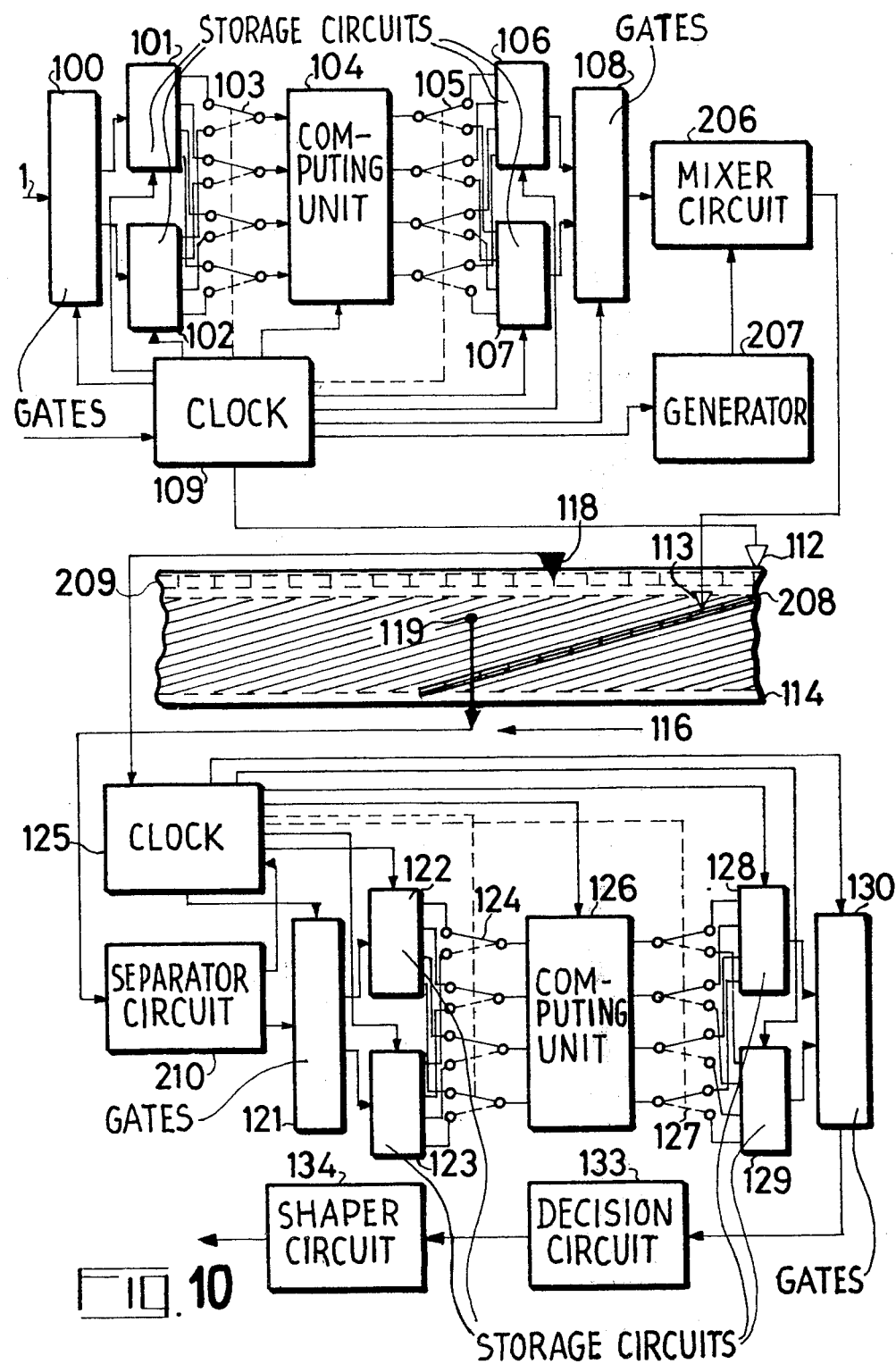
FIG. 10 is a block diagram of a data dissemination system which jointly disseminates the analogue components and the synchronising signal for the blocks of components.

In FIG. 10, there can be seen the diagram of a binary digital data dissemination system operating in accordance with the composite signal principle of FIG. 9(b).

The system of FIG. 10 comprises a pair of input terminals 1 supplied with the succession of 0 and 1 bits which are to be disseminated. An assembly 100 of analogue gates sequentially controlled by a shift-register, which has not been shown but connected to the clock 109, makes it possible to supply two blocks 101 and 102 of N analogue storage circuits which temporarily store the N binary components of two successive data blocks.

The N output terminals of the storage circuits 101 and 102 are alternately connected to the N input terminals of a computing unit 104 through a stack of switches 103. The computing unit 104 effects orthogonal transformation of a vector $[D_o]$ with N binary components to a vector $[A_o]$ with N analogue components. These appear at the output terminals which supply the stack of switches 105. The switches 105 alternately direct the analogue components of the vector $[A_o]$ to the two analogue store blocks 106 and 107 each comprising N storage circuits which are responsible for their temporary storage. An assembly 108 of analogue gates sequentially controlled by the clock 109 via a shift-register which has not been shown in the figure, is responsible for time-serial transmission of the analogue components in order to form the blocks of duration $T_1$ shown in FIG. 9(b). A mixer circuit 206 is supplied with these components as well as with the synchronising pulses furnished by a pulse generator 207. Under the control of the clock 109, the generator 207 supplies a pulse train of the kind shown in FIG. 9(c). At the output of the mixer circuit 206 the composite signal shown in FIG. 9(b) is obtained, this being the signal which is subsequently disseminated. The method of dissemination illustrated in FIG. is that of magnetic storage. A magnetic tape 114 performing a translatory motion in the direction 116 is traversed obliquely, along track sections 208, by a recording head 113 which receives the composite signal coming from the circuit 206. Each track section 208 contains the recording of several blocks of analogue components (11 blocks in FIG. 10). With each block of analogue components there can be arranged a corresponding address furnished by the clock 109 and recorded by an auxiliary recording head 112, on a marginal track 209 of the magnetic tape 114. The read-out of the magnetic tape has recourse to two pick-up heads 118 and 119 which scan the track in the same manner which takes place at the time of recording. The pick-up head 118 furnishes the addresses of the blocks to a clock 125 equipped with an identification circuit which effects comparison with a given address. The pick-up head 119 reconstitutes the composite signal at the input terminals of a separator circuit 210 which isolates at a first output, connected to the clock 125, the signal synchronising the blocks of analogue components. The analogue components are isolated at a second output of the separator circuit 210 and applied to a set of analogue gates 121 whose sequential operation is controlled by the clock 125. Two blocks of analogue storage circuits 122 and 123 effect temporary storage of the analogue components transmitted by the gates 121 and a computing unit 126 performs on these components the reverse transformation operation which furnishes the binary components. The N inputs and outputs of the computing unit 126 are connected by means of stacks of switches 124 and 127 to the outputs of the stores 122, 123 and to the inputs of the analogue stores 128 and 129. A set of analogue gates 130 controlled sequentially by the clock 125 is responsible for restoring the sequence of binary digital data. These latter then pass through a decision circuit 133 and a shaper circuit 134 which reshapes the 0 and 1 bits.

The operation of the dissemination system shown in FIG. 10 is essentially similar to that of the system shown in FIG. 7.

The two operating features to be pointed out, are concerned on the one hand with the synchronising of the clock 125, which depends upon the synchronising separator 210, and on the other hand with the sequential operating rate of the analogue gates. The analogue gates 108 operate at a rate higher than that of the analogue gates 100 because it is necessary that the duration of a block of analogue components should be reduced from T to $T_1$, in the manner shown in FIG. 9. The analogue gates 121 operate at the same rate as those 108. The analogue gates 130 have the same operating rate as those 100 so that the disseminated bits shall have the same transmission rate as those received at the input terminal 1 of the system. The magnetic apparatus responsible for the dissemination of the blocks of analogue components, can advantageously be constituted by a magnetoscope. This kind of recorder, normally assigned to the delayed dissemination of television video frequency signals, is entirely suitable for the storage of a composite signal such as that shown in FIG. 9(b).

In the foregoing description, it has implicitly been assumed that the channel for the dissemination of the analogue components would ensure their transmission without any amplitude change other than a rapid fluctuation regarded as transmission noise.

In fact, all transmission channels are characterised by a sensitivity which may undergo slow fluctuations and in the particular case of dissemination via a magnetic data carrier, these fluctuations can in particular result from the utilisation of a data carrier having non-uniform magnetic characteristics or ones which vary with time.

The random and rapid variation in sensitivity which take place within the period of transmission of a block of analogue components, fall within the category of noise which must be taken into account in order to evaluate the error rate of a dissemination system. This point has been discussed hereinbefore.

Besides rapid variations, there are variations in sensitivity which are sufficiently slow for it to be reasonable to assume that the N analogue components of a block are all affected in the same degree.

In this case, this modification undergone by the amplitudes of the analogue components is to some extent likenable to vector [B] which may be put in the form $[B] = b(1, 1, 1, \ldots 1)$, that is to say a vector whose components are all equal to unity with the exception of the factor $b$ which represents the uniform sensitivity fluctuation.

At the time of the reverse orthogonal transformation of the vector [B], the fluctuation in sensitivity has an effect $[\Delta D]$ on the binary digital components.

This effect can be written as:

$$[\Delta D] = [M]^{-1}[B]$$

and if [M] defines a WALSH-HADAMARD transformation, then with the exception of the factor $$\frac{1}{\sqrt{N}}$$

it becomes:

$$[D] = b(1, 0, 0, 0, \ldots 0)$$

This shows that when a sensitivity fluctuation produces systematic noise uniformly distributed over all the analogue components, this is only experienced, following reverse WALSH-HADAMARD transformation, by the zero index binary digital component.

In FIG. 11, on the abscissa the amplitudes $A_E$ of the analogue components at the input of a dissemination channel have been shown, and on the ordinates the amplitudes $A_S$ obtained after dissemination through the channel in question. The straight line 211 represents the law linking $A_E$ with $A_S$ in the case where $A_E = A_S$. At (b), the probability law 214 has been shown which characterises the distribution of the analogue components $A_S$ at the output of the dissemination channel, and at (c) the probability law 213 has been shown which characterises the distribution of the analogue components $A_E$ at the input of said channel.

Considering dissemination without any sensitivity fluctuations, it will be seen that these two laws coincide and that they can be deduced from one another by a transformation of coordinates based upon the graph 211 which represents a unit transmission factor.

In the presence of a slow fluctuation in sensitivity, such as $A_S = k A_E$ where $k > 1$, the graph 211 must be replaced by the graph 212 and in respect of the disseminated components a new distribution law 215 is obtained which substitutes the preceding one 214. The slow fluctuation is translated in terms of two effects:

1. an amplitude translation effect, in which the translation is equal to the interval $\Delta\tau$. If $\tau$ is the mean amplitude which corresponds to the most probable of the components $A_E$, then the amplitude of the translation effect will be $\Delta\tau = (k - 1)\tau$;

2. an homothetic effect of factor $k$, on all the components $A(i)$,

The amplitude translation effect $\Delta\tau$ only affects the amplitude of the zero index binary digital component. The homothetic effect affects all the components $A(i)$ which are multiplied by $k$; after reverse transformation we therefore obtain:

$$[M]^{-1}[kA] = [M]^{-1}[A] + (k-1)[M]^{-1}[A.]$$

The deviation observed in the binary digital components is $$[\Delta D] - [k-1][M]^{-1}[A.]$$

The components of the vector [A] are in fact random variables of mean square deviation $\sigma_A = \frac{1}{2}$. The gain variation can therefore be interpreted as a noise component of mean square deviation $\sigma = (k - 1)\frac{1}{2}$. However, we have seen hereinabove that in order for the noise not to affect the error rate which has been imposed, in the cited example it was necessary for $\sigma$ to be less than 0.08.

If we assume for example that $\sigma \leq 0.02$, then it will be seen that a sensitivity fluctuation such that:

$$0.02 \geq (k-1)\tfrac{1}{2}$$

or again $$k - 1 \leq 0.04$$

can be tolerated.

Consequently, it will be realised that a sensitivity fluctuation in the dissemination channel, reaching as much as 4 percent can be tolerated without any drawback. Self-evidently, the zero index binary digital component is disturbed and must not be counted as an effective one among the disseminated components.

If the fluctuations exceed some few percent, then the invention provides for their effects to be compensated.

With this object in mind, it is arranged that the zero order binary digital component is constituted systematically by a 0 bit in each block for dissemination. Thus, following dissemination in the presence of sensitivity fluctuations, the amplitude of this component in each block is given:

$$\left[\frac{D - D_o}{D_o}\right] = k - 1 = \frac{\Delta\tau}{\tau}$$

We thus have a means of finding out the value $k$ of the transmission factor and it is possible to correct the homothetic effect referred to earlier.

With this in view, before performing the reverse transformation, the analogue components $A(i)$ can be multiplied by a factor $1/k$, but a more economic technique is to vary the threshold of decision between the bits 0 and 1 after the analogue components have undergone reverse transformation.

FIG. 12 illustrates a diagram which plots as a function of the amplitudes of the binary digital components $D(k)$, the probability distribution laws corresponding to the 0 and 1 bit. For a transmission factor of unity, in the case of a 0 bit, the hump graph 40 is obtained, and for a 1 bit the graph 41. In this case, the decision threshold must be chosen at the level 42 whose value is $\frac{1}{2}$. In the presence of a sensitivity variation giving rise to the transmission factor $k > 1$, the graphs 40 and 41 are replaced by those 217 and 218 and the decision threshold 42 is no longer suitable for the sorting of the binary components $D(k)$. However, if, as decision threshold, the level 216 of abscissa value ($\frac{1}{2}$)$k$ is chosen, then it will be seen that the recognition of the 0 and 1 bits in the presence of noise, one again gives rise to a very low error rate.

Figure 13:
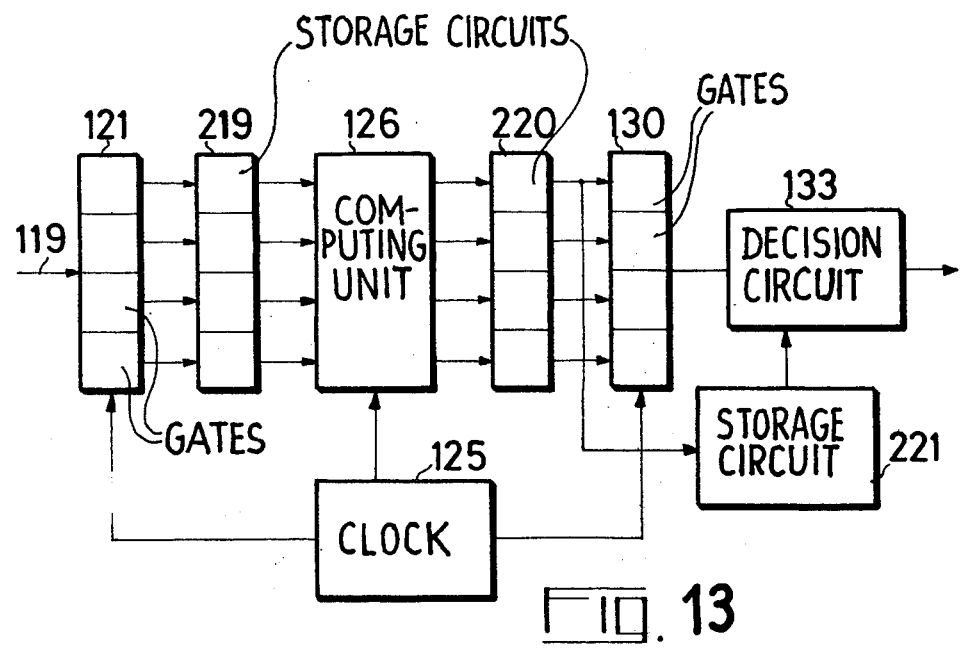
FIG. 13 is a block diagram of part of a data dissemination system which has been compensated in respect of slow sensitivity fluctuations.

In FIG. 13, a fragmentary view of a data dissemination system equipped with a circuit correcting for sensitivity fluctuation, has been shown.

To a major extent, the references used are those employed already in FIG. 10 but to simplify matters, the storage circuits and the switches which surround the computing unit 126, have here been marked as blocks 219 and 220. The zero index binary digital component is available at the output of the computing unit 126 which occupies the top position in FIG. 13. A storage circuit 221 is connected to said output and transmits to the decision threshold circuit 133 the threshold value which takes account of the sensitivity variations to be compensated for. When a block of analogue components is supplied at the output 119 of the dissemination channel (pick-up head of a magnetoscope), the components A(i) are stored in the storage circuits 219 for processing by the computing unit 126 which subsequently performs a reverse transformation on them. The binary digital components obtained are stored in the storage circuits 220 and then transmitted sequentially by the set of analogue gates 130 to the decision threshold circuit 133. Before the commencement of this transmission, the value of the zero order binary digital component is stored in the circuit 221 which furnishes the threshold value $(\frac{1}{2})k$ to the circuit 133. Thus, when the binary digital components D(k) pass through the circuit 133, the identification of the 0 and 1 bits is performed using the threshold value $(\frac{1}{2})k$, this ensuring compensation of the sensitivity fluctuations. For a block of N components, there are at the output N − 1 useful bits, since the first is a 0 bit whatever the block in question.

The measurement of the homothetic effect can likewise be performed: the mean value of the analogue components is at a level $\tau$ which acquires the value $k\tau$ due to sensitivity fluctuations. It is therefore possible to measure said mean value and store it in the storage circuit 221 in order to effect threshold compensation. In this case, effectively all the bits contained in a block of components are available.

It is also possible to use the variations in the amplitude of the synchronising signal because the latter is affected by the homothetic effect, being transmitted jointly with the analogue components in accordance with the diagram of FIG. 9(b). In this case, the storage circuit 221 is supplied with the value of the amplitude of the synchronising signal shown at (c) in FIG. 9.

The synchronising signal is available at one of the outputs of the separator 210 and its normal value S changes to $kS$ in the presence of sensitivity fluctuations.

Figure 14:
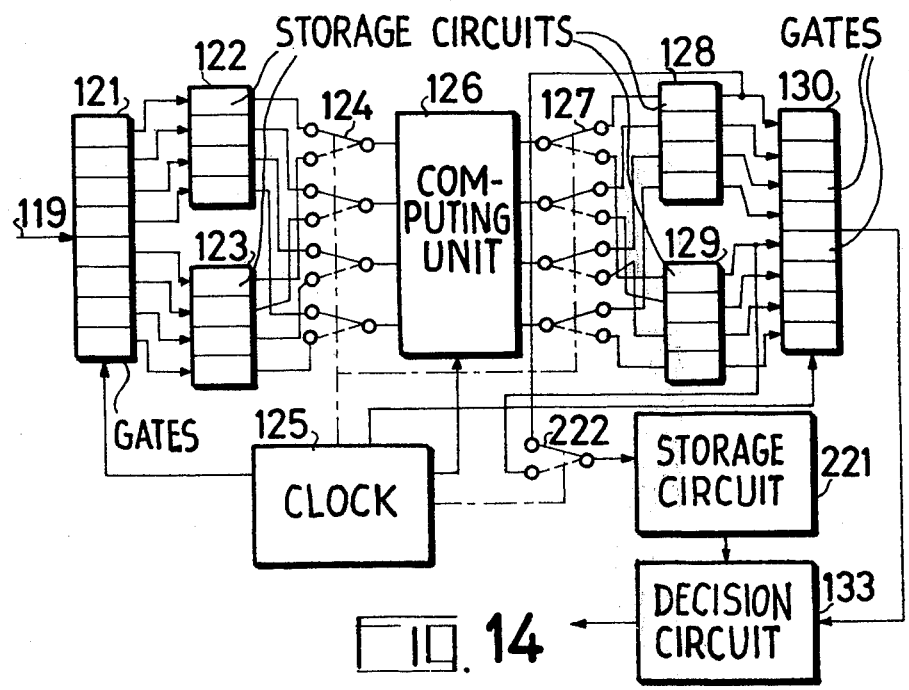
FIG. 14 illustrates a variant embodiment of the system schematically shown in FIG. 13.

In FIG. 14, there can be seen a fragmentary diagram of a variant embodiment of the data dissemination system in accordance with the invention.

The majority of the references used are those already contained in FIGS. 10 and 13, a decision threshold circuit 133 has been provided which is supplied with a level value stored in a storage circuit 221. The input to the circuit 221 of the information characteristic of the sensitivity fluctuation is effected through a switch 222 whose input terminals are respectively connected to the zero index outputs of the storage circuits 128 and 129 which are used to store the binary digital components of two successive blocks.

Through this arrangement it is possible to fix the decision threshold used to identify the bits 0 and 1 of a block, commencing from the value acquired by the zero order of binary digital component during the course of the reverse transformation of the data belonging to the preceding block. In this case, it is necessary for the sensitivity fluctuation to be sufficiently slow for the value of the transmission factor $k$ of one block to coincide with that of the next.

In order that compensation by adjustment of the decision threshold can be suitably affected, it is necessary that the adjustment in question should precede the phase of successive transmission of the binary digital components accumulated in the storage blocks following the reverse transformation. With alternate operation of the kind shown in FIG. 14, the requisite time is available in order to effect adjustment of the decision threshold. By contrast, if the decision threshold of a block is to be adjusted by means of a sensitivity indication relating to this block itself, it is necessary to utilise the method of transmission of the analogue component which requires a duration $T_1$ less than the recurrence periodicity T of the blocks. In other words, when utilising the method of dissemination shown in FIG. 9(b), the time interval $T_2$ is available in order to effect adjustment of the threshold before triggering the operation of the register which is responsible for the serial transmission of the binary digital components accumulated following the reverse transformation.

It frequently happens that the information source furnishes binary digital data by the simultaneous emission of $p$, 0 and 1 bits forming a word. This kind of information source comprises $p$ output terminals and, at an arbitrary instant, a complete word is present at these terminals. The dissemination of words of $p$ bits in the form of blocks of N components is possible if N is chosen equal to $p$ or if N is made a multiple of $p$, $(N = pq)$.

To illustrate this fact, in FIG. 15 there can be seen a binary digital data dissemination system capable of disseminating words of $p$ bits in the form of blocks of $N = p$ components.

In FIG. 15, the block 223 comprises the data source with $p$ output terminals connected to $p$ analogue gates which, at the rate of arrival of the words, supply a set of $p$ analogue storage circuits 224. The computing unit 104 effects direct transformation of the input vector whose components are the bits accumulated in the storage circuits 224. The result is a vector whose analogue components are stored in the set of storage circuits 225. The set of analogue gates 226 is associated with a shift-register (not shown) controlled by the clock 109 in order to successively transfer the content of the storage circuits 225 to a mixer circuit 227. A pulse generator 207 operating synchronously with the clock 109 furnishes the synchronising signal for the blocks of components, to the mixer circuit 227. At the output of the mixer circuit 227 a composite signal is obtained of the kind shown in FIG. 9(b). The composite signal is disseminated by a system comprising a recording head 113, a data carrier 114 and a pick-up head 119.

After dissemination, the composite signal is received by a synchronising separator circuit 210 whose first output controls the clock 125. The other output of the separator circuit 210 successively furnishes the analogue components of the disseminated blocks. These latter are transmitted for storage in the storage circuits 219, by means of a set of analogue gates 121 controlled by a shift-register which has not been shown. The computing unit 126 performs reverse transformation on the components of each block, this terminating in the storage of the binary digital components in a set of storage circuits 220 where they become simultaneously available. All that remains is to transmit them simultaneously through a set of decision threshold circuits 133, in order to recover one by one the words made up of $p$, 0 and 1 bits. Compensation of the sensitivity fluctuations in the dissemination channel, is effected by means of a storage circuit 221 which fixes the value of the decision threshold for each circuit 133 as a function of the value of the zero index binary digital component taken from the storage circuits 220.

In the general case, the words to be disseminated comprise $p$ bits and dissemination is effected in the form of blocks of $N = p \cdot q$ components where $q$ is a whole number.

In this case, it is necessary to provide N analogue. gates in the data source 223 forming $q$ groups of $p$ gates, and a shift register successively controlling said groups by simultaneously opening the $p$ gates of each group. In this case, it is also necessary to provide a similar arrangement downstream of the N storage circuits 220 in order to reconstitute successive words of $p$ bits.

By way of non-limitative example, it is possible for instance to disseminate 16 bit words at a rate of 120,000 words per second, by forming blocks of 128 components. The analogue dissemination channel must carry $1.92 \times 10^6$ analogue components per second and must make it possible to distinguish 64 amplitude levels in order to achieve an error rate not exceeding $10^{-9}$. With a magnetic storage density of 30 square microns per stored point, it is necessary for the recording head to scan a magnetic tape area of the order of $6 \times 30 \times 2.10^6 \mu^2$ or 360 mm², each second; if the effective width of the magnetic tape is 0.3 mm, then a tape transfer speed of the order of 1 m/sec is obtained. As far as the composite disseminated signal is concerned, the following voltage levels will for example be adopted:

Voltage range (205) of the synchronising signal: 0 to 0.25 volt.
Voltage range (203) of the analogue components: 0.3 to 1 volt.
Intermediate dead range (204): 0.25 to 0.3 volt.

What we claim is:

1. A communication system for the dissemination of digital data constituted by a succession of 0 and 1 bits coming from a data source, said communication system comprising: grouping means fed from said data source for grouping said bits in the form of vectors of N binary components, orthogonal Walsh Hadamard transformation means receiving the vectors having said binary components and converting them into orthogonal vectors each having N analogue components, analogue means arranged for disseminating said orthogonal vectors, a compensating circuit adapted for detecting the amplitude fluctuations experienced by said orthogonal vectors in said analogue means, said compensating circuit comprising a storage circuit, having an output, for temporarily storing characteristic values of said amplitude fluctuations, reverse transformation means receiving the disseminated orthogonal vectors, available at the output of said analogue means and means for reconstituting said succession of bits from the reconstructed vectors of N binary components furnished by said reverse transformation means, said means for reconstituting said succession of bits comprising a reshaping means operating at an adjustable decision level, said reshaping means having an adjusting input coupled to the output of said storage circuit, said decision level being adjusted according to said characteristic values.

2. A communication system as claimed in claim 1, wherein the first component of each of said vectors of N binary components being a 0 bit prior to any transformation, said detected amplitude fluctuations are the values of the first components of said reconstructed vectors which form said characteristic values stored in said storage circuit.

3. A communication system as claimed in claim 2, wherein said storage circuit is adapted for delivering to said reshaping means the characteristic value of the 0 bit of a first reconstructed vector during the reconstitution of the succession of bits of the reconstructed vector following said first reconstructed vector.

4. A communication system as claimed in claim 1, wherein the first analogue components of said orthogonal vectors having a mean value equal to $$\frac{\sqrt{N}}{2},$$

$$\frac{\sqrt{N}}{2},$$

translating means are associated to said orthogonal transformation means for translating said first analogue components by $$\frac{\sqrt{N}}{2}$$

in order that all said analogue components are comprised within a first amplitude range, wherein synchronising means are provided between said orthogonal transformation means and said analogue means in order to interpose a synchronising signal between two successive vectors of N analogue components, said synchronising signal being formed by pulses having a recurrence frequency equal to the frequency of said orthogonal vectors and occupying a second amplitude range adjacent to said first amplitude range, and wherein separator means for extracting said synchronising signal and for selectively transmitting said analogue components are arranged between said analogue means and said reverse transformation means.

5. A communication system as claimed in claim 4, wherein said detected amplitude fluctuations are detected by measuring the values of said synchronising pulses delivered by said separator means.

6. A communication system as claimed in claim 1, wherein said amplitude fluctuations are detected by measuring mean values of said N analogue components for each of said orthogonal vectors.

7. A communication system as claimed in claim 4, wherein the dissemination time of said orthogonal vectors is shorter than their recurrence periodicity, said synchronising pulses being arranged in the time interval separating two successive orthogonal vectors.

8. A communication system as claimed in claim 7, wherein said synchronising means comprise a synchronising pulse generator and a mixer circuit having two inputs adapted for respectively receiving said synchronising pulses from said generator and said orthogonal vectors from said orthogonal transformation means.

9. A communication system as claimed in claim 4, wherein said digital data being formed by words comprising $p$ parallel bits, said grouping means form, from said words, blocks comprising $N = p \cdot q$ binary components, $q$ being a whole number, said reconstituting means successively forming words of $p$ parallel bits from the blocks of N binary components coming from said reverse transformation means.

10. A communication system as claimed in claim 1, further comprising address generator means for emitting an address in order to identify each of said disseminated orthogonal vectors and means for the selective read-out of said address in order to pinpoint an arbitrary one of said orthogonal vectors.

* * * * *